(12) United States Patent
Canini et al.

(10) Patent No.: US 10,198,647 B2
(45) Date of Patent: Feb. 5, 2019

(54) COMPACT IMAGING MODULE WITH RANGE FINDER

(71) Applicant: Datalogic IP Tech, S.r.l., Bologna (IT)

(72) Inventors: Federico Canini, Bologna (IT); Anna Guagliumi, Bologna (IT)

(73) Assignee: Datalogic IP Tech, S.R.L., Bologna (IT)

( * ) Notice: Subject to any disclaimer, the term of this patent is extended or adjusted under 35 U.S.C. 154(b) by 401 days.

(21) Appl. No.: 14/866,068

(22) Filed: Sep. 25, 2015

(65) Prior Publication Data

US 2017/0091571 A1    Mar. 30, 2017

(51) Int. Cl.
| | |
|---|---|
| G06K 9/18 | (2006.01) |
| H04N 5/225 | (2006.01) |
| G01C 3/08 | (2006.01) |
| H04N 7/18 | (2006.01) |
| G06K 7/10 | (2006.01) |

(52) U.S. Cl.
CPC ............ *G06K 9/18* (2013.01); *G01C 3/08* (2013.01); *G06K 7/10722* (2013.01); *H04N 5/2256* (2013.01); *H04N 7/18* (2013.01)

(58) Field of Classification Search
None
See application file for complete search history.

(56) References Cited

U.S. PATENT DOCUMENTS

| | | |
|---|---|---|
| 5,354,877 A | 10/1994 | Behr et al. |
| 5,378,883 A | 1/1995 | Batterman et al. |
| 5,422,472 A | 6/1995 | Tavislan et al. |
| 5,671,374 A | 9/1997 | Postman et al. |
| 5,955,720 A | 9/1999 | He et al. |

(Continued)

FOREIGN PATENT DOCUMENTS

| | | |
|---|---|---|
| EP | 0962880 A1 | 12/1999 |
| EP | 1444639 B1 | 5/2005 |

(Continued)

OTHER PUBLICATIONS

International Search Report and Written Opinion, dated Dec. 21, 2016, for corresponding International Application No. PCT/US2016/052098, 11 pages.

*Primary Examiner* — Mohammad J Rahman

(74) *Attorney, Agent, or Firm* — Cozen O'Connor

(57) ABSTRACT

Systems and methods of operation for a machine-readable symbol reader for estimating the distance of a scanned target object or item labeled with indicia, such as a machine-readable symbol. The reader may include an illumination subsystem which projects a light pattern (e.g., line) out from the reader. The reader may capture an image of the target object while the light pattern is projected thereon and analyze at least one detectable characteristic of the pattern to estimate distance of the target object relative to the reader. A one-dimensional sensor array of the reader may be exploited in part for imaging a symbol and in part for imaging detectable characteristics (e.g., edges) of the projected illumination pattern which allows for estimation of the reading distance. A central portion of the one-dimensional sensor array may be dedicated to imaging a machine-readable symbol and lateral portions may be dedicated to implementing a range finder.

28 Claims, 9 Drawing Sheets

(56) References Cited

U.S. PATENT DOCUMENTS

| | | |
|---|---|---|
| 6,000,612 A | 12/1999 | Xu |
| 6,123,264 A | 9/2000 | Li et al. |
| 6,512,218 B1* | 1/2003 | Canini ............... G06K 7/10722 250/208.1 |
| 6,708,883 B2 | 3/2004 | Krichever |
| 7,303,131 B2 | 12/2007 | Carlson et al. |
| 7,514,702 B2 | 4/2009 | Barkan et al. |
| 8,328,099 B2 | 12/2012 | Thuries et al. |
| 2003/0062413 A1 | 4/2003 | Gardiner et al. |
| 2004/0118919 A1 | 6/2004 | Breytman et al. |
| 2006/0192978 A1* | 8/2006 | Laguarta Bertran .. G01B 11/12 356/601 |
| 2007/0018124 A1* | 1/2007 | Nishi ............... G02B 27/0025 250/559.36 |
| 2007/0063048 A1 | 3/2007 | Havens et al. |
| 2007/0127039 A1* | 6/2007 | Njolstad ............ G01B 11/026 356/624 |
| 2008/0012850 A1* | 1/2008 | Keating, III ......... H04N 13/254 345/419 |
| 2009/0295933 A1* | 12/2009 | Schechner ............... G06T 5/50 348/222.1 |
| 2010/0147957 A1 | 6/2010 | Gurevich |
| 2013/0038719 A1 | 2/2013 | Canini et al. |
| 2013/0292478 A1* | 11/2013 | Wang ................. G06K 7/10712 235/472.01 |
| 2014/0000520 A1* | 1/2014 | Bareket ................ A01J 5/0175 119/14.02 |
| 2014/0320023 A1* | 10/2014 | Cannon ............. H05B 33/0854 315/153 |
| 2015/0178533 A1 | 6/2015 | Canini et al. |
| 2016/0219221 A1* | 7/2016 | Yachi ...................... G01C 3/06 |
| 2016/0284102 A1* | 9/2016 | Yoshikawa ............... G06T 7/60 |
| 2018/0047148 A1* | 2/2018 | Xu ..................... G01N 21/8851 |

FOREIGN PATENT DOCUMENTS

| | | |
|---|---|---|
| WO | 97/19416 A1 | 5/1997 |
| WO | 2005/043449 A1 | 5/2005 |
| WO | 2011/111079 A1 | 9/2011 |

\* cited by examiner

COMPACT IMAGING MODULE WITH RANGE FINDER

BACKGROUND

Technical Field

The present disclosure generally relates to decoding machine-readable symbols.

Description of the Related Art

Machine-readable symbols encode information in a form that can be optically read via a machine-readable symbol reader or scanner. Machine-readable symbols take a variety of forms, the most commonly recognized form being the linear or one-dimensional machine-readable symbol. Other forms include two-dimensional machine-readable symbols such as stacked code symbols, area or matrix code symbols, or digital watermarks. These machine-readable symbols may be made of patterns of high and low reflectance areas. For instance, a one-dimensional or barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white). Machine-readable symbols may also include human-readable symbols (e.g., alpha, numeric, punctuation).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a forklift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Moreover, some machine-readable symbol readers include an illumination subsystem which provides illumination and which aids the operator in positioning the reader with respect to the machine-readable symbol by displaying on a surface of a target object a visual indication of the region framed by the imaging subsystem, for example, the center of the region and/or at least part of the edges and/or corners of the region. Some machine-readable symbol readers may also include a range finder for measuring or estimating the reading distance, namely the distance between a sensor of the machine-readable symbol reader and the target object.

The measurement or estimate of the distance may be used by the machine-readable symbol reader to activate a decoding algorithm only when the optical information is located at a distance comprised between a minimum and maximum working distance, and/or to control a zoom device and/or a device to automatically change the focusing distance of the machine-readable symbol reader. Moreover, the measurement or estimate of the distance can be used in the case in which digital restoration of the image is necessary, since a degrading function, or PSF (point spread function) of the optics of the image forming device may depend upon the reading distance. Furthermore, the measurement or estimate of the distance may be necessary to calculate the volume of an object, if such functionality is implemented in a machine-readable symbol reader.

BRIEF SUMMARY

An imaging system may be summarized as including at least one image formation subsystem which includes: a sensor including a one-dimensional array of photosensitive elements; and at least one receiver optical element which focuses light onto the sensor to provide the at least one image formation subsystem with an angular field of view having a first angle; at least one illumination subsystem which includes: at least one light source which projects a light pattern having an angular field of projection defined by a second angle, the second angle less than the first angle; at least one processor operatively coupled to the at least one image formation subsystem and the at least one illumination subsystem; at least one nontransitory processor-readable storage medium operatively coupled to the at least one processor and storing at least one of data or instructions which, when executed by the at least one processor, cause the at least one processor to: receive an image of a target object from the at least one image formation subsystem captured thereby while the at least one illumination subsystem is activated and projects the light pattern onto the target object, the image includes an array of pixel values which each correspond to a quantity of light incident on a corresponding one of the photosensitive elements in the one-dimensional array of photosensitive elements; analyze a ranging subarray of the pixel values to determine a distance of the target object from the imaging system based at least in part on detection of at least a portion of a periphery of the light pattern projected onto the target object by the at least one light source; and store an imaging subarray of the pixel values in the at least one nontransitory processor-readable storage medium as image data to be analyzed to detect one or more machine-readable symbols therein, the imaging subarray of the pixels values different from the ranging subarray of the pixel values. The ranging subarray of the pixel values may correspond to a subarray of photosensitive elements at a least one lateral end portion of the array of photosensitive elements.

The imaging subarray of the pixel values may correspond to a subarray of photosensitive elements which does not include photosensitive elements at the lateral end portions of the array of photosensitive elements. The at least one light source may project a light pattern comprising a line, and the periphery of the light pattern may include a first end edge of the line and a second end edge of the line opposite the first end edge of the line. The array of photosensitive elements may include an ordered number N of the photosensitive elements $PE_{1-N}$ and the array of pixel values may include a corresponding ordered number N of the pixel values $PV_{1-N}$, and the ranging subarray may include the pixel values $PV_{1-X}$ and the pixel values $PV_{Y-N}$ and the imaging subarray may include the pixel values $PV_{(X+1)-(Y-1)}$, where X is less than Y, and Y is less than N. The number of the pixel values $PV_{1-X}$ may be equal to the number of the pixel values $PV_{Y-N}$. The at least one light source may project a light pattern having a predominant wavelength of between 495 and 570 nanometers. The at least one light source may include at least one of: a light emitting diode (LED), a laser, or a superluminescent diode. The at least one light source may include a single pixel light emitting diode (LED) light source. Each of the photosensitive elements may have a width less than or equal to 5.25 micrometers and a length less than or equal to 64.0 micrometers. The first angle may be greater than 55 degrees. The first angle may be between 60 degrees and 70 degrees, and the second angle may be between 40 degrees and 60 degrees. The angular field of view of the at least one image formation subsystem may have at least one of a different origin or a different inclination from the angular field of projection of the at least one illumination subsystem.

The at least one processor may analyze the ranging subarray of the pixel values to determine a distance of the target object from the imaging system based at least in part on: detection of a location of at least a portion of the periphery of the light pattern projected onto the target object by the at least one light source; or detection of a relative signal level for at least a portion of the periphery of the light pattern projected onto the target object by the at least one light source. The angular field of projection of the at least one illumination subsystem may be horizontally symmetric with the angular field of view of the at least one image formation subsystem. The at least one illumination subsystem may include a first lens which collimates light from the at least light source; and a beam shaper which generates the light pattern. The one-dimensional array of photosensitive elements may include at least 2500 photosensitive elements, and the imaging subarray of the pixel values may correspond to at least 2000 of the photosensitive elements. The at least one image formation subsystem and the at least one illumination subsystem may have a combined length less than or equal to 21 millimeters, a combined width less than or equal to 16 millimeters, and a combined height less than or equal to 12 millimeters.

A method of operation for an imaging system, the imaging system including at least one image formation subsystem which includes: a sensor including a one-dimensional array of photosensitive elements; and at least one receiver optical element which focuses light onto the sensor to provide the at least one image formation subsystem with an angular field of view having a first angle; at least one illumination subsystem which includes: at least one light source; at least one processor operatively coupled to the at least one image formation subsystem and the at least one illumination subsystem; at least one nontransitory processor-readable storage medium operatively coupled to the at least one processor and storing at least one of data or instructions, the method may be summarized as including receiving, by the at least one processor from the at least one image formation subsystem, an image of a target object captured while the at least one illumination subsystem is activated and projects a light pattern onto the target object, the light pattern having an angular field of projection defined by a second angle, the second angle less than the first angle, the image includes an array of pixel values which each correspond to a quantity of light incident on a corresponding one of the photosensitive elements in the one-dimensional array of photosensitive elements; analyzing, by the at least one processor, a ranging subarray of the pixel values to determine a distance of the target object from the imaging system based at least in part on detection of at least a portion of a periphery of the light pattern projected onto the target object by the at least one light source; and storing, by the at least one processor, an imaging subarray of the pixel values in the at least one nontransitory processor-readable storage medium as image data to be analyzed to detect one or more machine-readable symbols therein, the imaging subarray of the pixels values different from the ranging subarray of the pixel values.

The method may further include activating, by the at least one processor, the at least one illumination subsystem which causes the at least one light source thereof to project a line, and the periphery of the light pattern comprises a first end edge of the line and a second end edge of the line opposite the first end edge of the line. Analyzing a ranging subarray of the pixel values may include analyzing a ranging subarray of the pixel values, the array of photosensitive elements may include an ordered number N of the photosensitive elements $PE_{1-N}$ and the array of pixel values may include a corresponding ordered number N of the pixel values $PV_{1-N}$, the ranging subarray may include the pixel values $PV_{1-N}$ and the pixel values $PV_{Y-N}$ and the imaging subarray may include the pixel values $PV_{(X+1)-(Y-1)}$, where X is less than Y, and Y is less than N. Analyzing a ranging subarray of the pixel values may include analyzing the ranging subarray of the pixel values to determine a distance of the target object from the method based at least in part on: detection of a location of at least a portion of the periphery of the light pattern projected onto the target object by the at least one light source; or detection of a relative signal level for at least a portion of the periphery of the light pattern projected onto the target object by the at least one light source.

An imaging system may be summarized as including a sensor including an array of photosensitive elements having an angular field of view having a first angle; at least one light source which projects a light pattern having an angular field of projection defined by a second angle, the second angle less than the first angle; at least one processor operatively coupled to the at least one sensor and the at least one light source; at least one nontransitory processor-readable storage medium operatively coupled to the at least one processor and storing at least one of data or instructions which, when executed by the at least one processor, cause the at least one processor to: receive an image of a target object from the sensor captured while the at least one light source is activated and projects the light pattern onto the target object, the image includes an array of pixel values which each correspond to a quantity of light incident on a corresponding one of the photosensitive elements in the array of photosensitive elements; analyze a ranging subarray of the pixel values of the captured image to determine a distance of the target object from the imaging system based at least in part on detection of at least a portion of a detectable characteristic of the light pattern projected onto the target object by the at least one light source; and store an imaging subarray of the pixel values of the captured image in the at least one nontransitory processor-readable storage medium as image data to be analyzed to detect one or more machine-readable symbols therein, the imaging subarray of the pixels values different from the ranging subarray of the pixel values.

The ranging subarray of the pixel values may correspond to a subarray of photosensitive elements at least one lateral end portion of the array of photosensitive elements. The imaging subarray of the pixel values may correspond to a subarray of photosensitive elements which does not include photosensitive elements at the lateral end portions of the array of photosensitive elements. The at least one light source may project a light pattern comprising a line, and the detectable characteristic of the light pattern may include a first end edge of the line and a second end edge of the line opposite the first end edge of the line. The at least one light source may project a light pattern having a predominant wavelength of between 495 and 570 nanometers. The at least one light source may include at least one of: a light emitting diode (LED), a laser, or a superluminescent diode. The at least one light source may include a single pixel light emitting diode (LED) light source. Each of the photosensitive elements may have a width less than or equal to 5.25 micrometers and a length less than or equal to 64.0 micrometers. The first angle may be greater than 55 degrees. The first angle may be between 60 degrees and 70 degrees, and the second angle may be between 40 degrees and 60 degrees. The angular field of view of the at least one sensor may have at least one of a different origin or a different inclination from the angular field of projection of the at least one light source.

The at least one processor may analyze the ranging subarray of the pixel values to determine a distance of the target object from the imaging system based at least in part on: detection of a location of at least a portion of the detectable characteristic of the light pattern projected onto the target object by the at least one light source; or detection of a relative signal level for at least a portion of the detectable characteristic of the light pattern projected onto the target object by the at least one light source.

The angular field of projection of the at least one light source may be horizontally symmetric with the angular field of view of the at least one sensor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
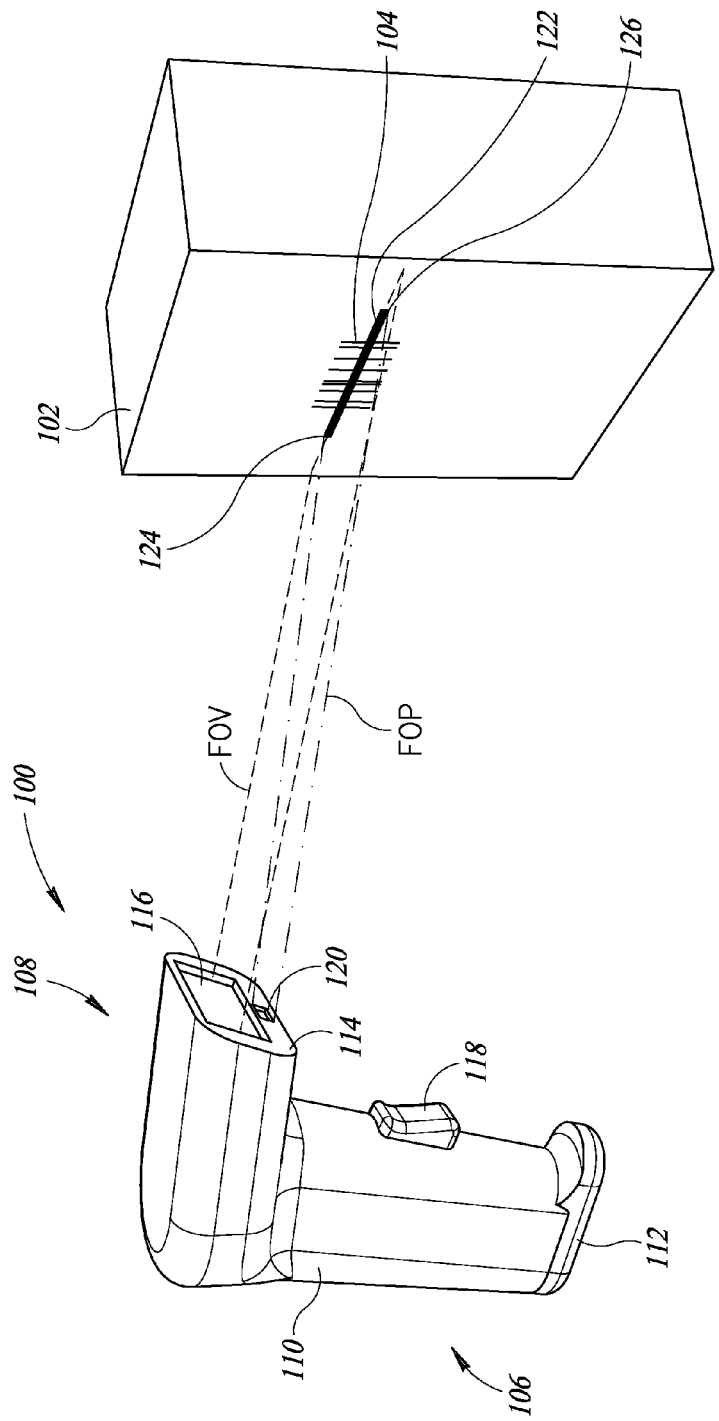
FIG. 1 is a perspective view of a machine-readable symbol reader and target object, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with machine-readable symbol readers, range finders, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure are directed to systems and methods for measuring or estimating the distance of a scanned target object or item labeled with indicia, such as a machine-readable symbol (e.g., barcode, alphanumeric characters). Advantageously, such distance information may be provided to a localization process or a decoding process to assist such processes in decoding the indicia from an image of the object labeled with the indicia. For example, in some implementations, a decoder may be configured with parameters based on the measured distance of the target object. As another example, in some implementations captured images may be pre-processed with a transformation that is determined according to the target object's estimated distance. As a further example, a notification may be provided to a user based on the measured distance which instructs the user to move the reader closer to or farther from the target object according to the target object's estimated distance. Using the systems and methods disclosed herein, decoders may successfully decode indicia on target objects at various scanning distances.

One or more implementations discussed here provide a miniaturized imaging system or scan engine based on a linear image sensor having an extended depth of field and including a range finder. The imaging system may have an overall size of about 15.75 mm width, 21 mm length, and 11.4 mm height, for example. Generally, the linear image sensor may include relatively large pixels which permit sufficient sensitivity to provide the extended depth of field. As discussed further below, the sensor array is exploited in part for imaging a machine-readable symbol and in part for imaging detectable characteristics (e.g., edges) of a projected illumination pattern which allows for estimation of the reading distance, thus implementing a range finder. In some implementations, a portion (e.g., a substantially central portion) of the sensor array is used for imaging a machine-readable symbol and at least one lateral portion of the sensor array is used to implement the range finder.

FIG. 1 shows a handheld machine-readable symbol reader or scanner 100 acting upon a target object 102 labeled with a machine-readable symbol 104 (e.g., barcode symbol). The reader or scanner 100 may be an imaging based machine-readable symbol reader. The handheld machine-readable symbol reader 100 includes a gripping portion 106 shaped and sized to be grasped by an operator's hand and a scanning head portion 108 extending from an upper portion 110 of the gripping portion. A lower portion 112 of the gripping portion 106 a may be shaped and sized to be received in a docking station (not shown). The machine-readable symbol reader 100 includes a front wall region 114 on the scanning head portion 108. The scanning head portion 108 also includes a transparent window 116 present on the front wall 114 behind which is positioned an image formation subsystem, as discussed below.

The machine-readable symbol reader 100 may be used in at least one of a handheld mode or a fixed position mode. In the fixed position mode, the reader 100 may be received in a docking station and the target object 102 having a machine-readable symbol 104 may be brought within the angular field of view (FOV) of the machine-readable symbol reader to have the reader 100 read or detect the machine-readable symbol 104. In the handheld mode, the reader 100 may be carried by an operator and positioned such that the surface of the target object 102 carrying the machine-readable symbol 104 is within the field of view (FOV) of the reader. In the handheld mode, imaging and decoding of the target machine-readable symbol 104 may be initiated by the operator depressing a trigger 118, for example.

For the purpose of this description, a handheld imaging based machine-readable symbol system is discussed. However, it will be apparent to one of ordinary skill in the art that the techniques and devices described herein can be practiced advantageously with stationary, bi-optic, or other types of readers or scanners.

The machine-readable symbol reader 100 may also include an illumination subsystem 120, for example, positioned on the front wall 114 of the scanning head portion 108 of the reader. In the illustrated implementation, the illumination subsystem 120 projects a line-shaped illumination pattern 122 onto the target object 102. As discussed below, the illumination subsystem 120 may also be positioned behind the window 116 adjacent the image formation subsystem. The line-shaped illumination pattern 122 comprises a horizontal line terminating in a left edge 124 and a right edge 126. The length of the line 122 is defined by an angular field of projection (FOP) of the illumination subsystem 120 and, as such, the length of the projected line is dependent on the distance of the target object 102 from the reader 100. In addition to providing illumination, such illumination pattern 122 allows the operator to aim the machine-readable symbol reader 100 toward the machine-readable symbol 104 provided on the surface of the target object 102. As discussed further below, the illumination pattern 122 is also utilized to measure or estimate the relative distance of the target object 102 from the machine-readable symbol reader 100.

Figure 2:
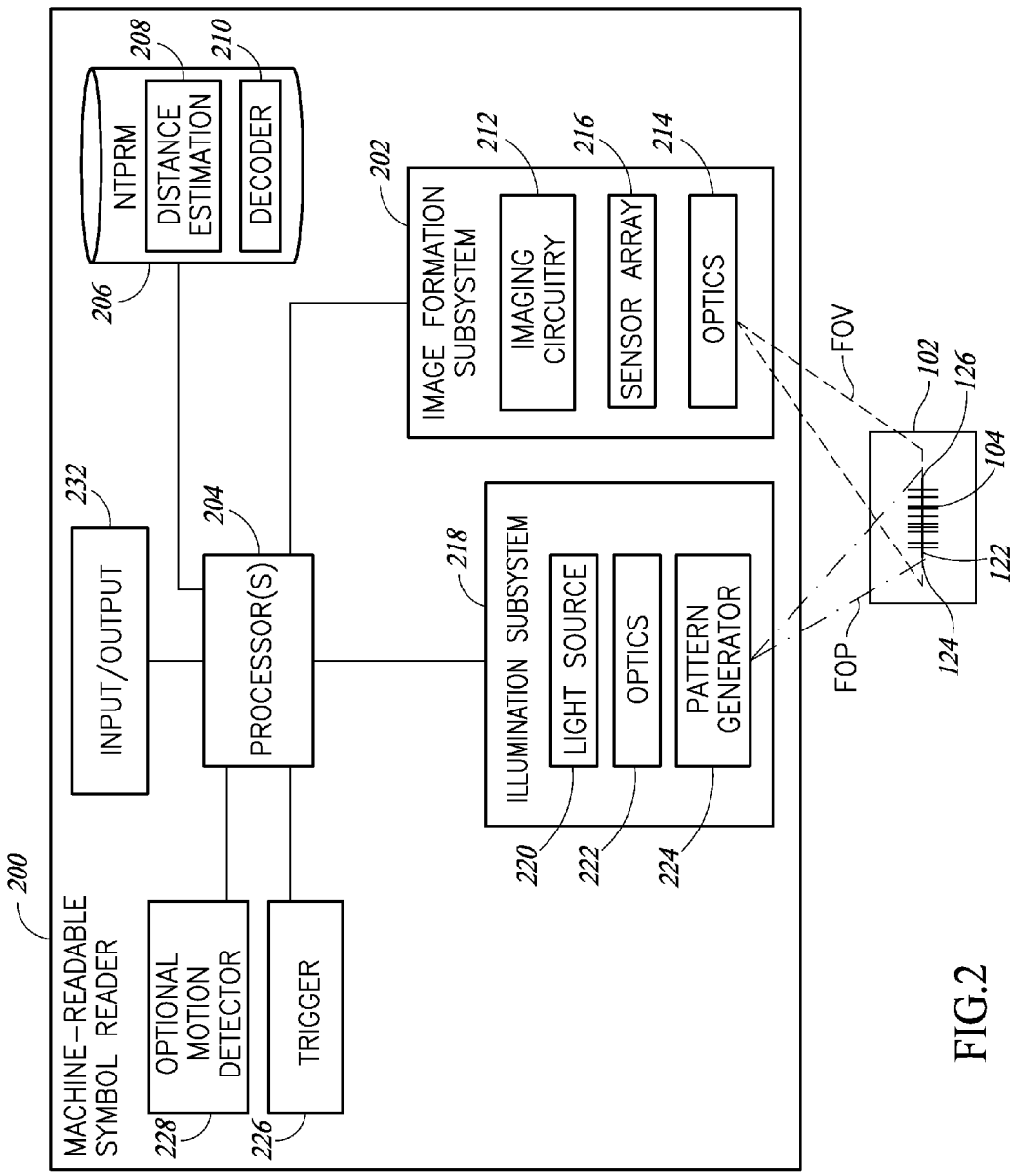
FIG. 2 is a functional block diagram of a machine-readable symbol reader, according to one illustrated implementation.

FIG. 2 is a block diagram of an imaging based machine-readable symbol reader 200 in accordance with at least some implementations of the present disclosure. The machine-readable symbol reader 200 may be similar or identical to the machine-readable symbol reader 100 of FIG. 1. The machine-readable symbol reader 200 includes an image formation subsystem 202 which captures image frames of graphical indicia such as the machine-readable symbol 104 of FIG. 1 present in the field of view (FOV) of the image formation subsystem 202. The reader 200 also includes one or more processors 204 operatively coupled to a nontransitory processor-readable storage medium 206 which stores distance estimation logic 208 and decoder logic 210. Execution of the decoder logic 210 by the processor 204 causes the processor 204 to decode encoded indicia within a captured image frame. Execution of the distance estimation logic 208 by the processor 204 causes the processor 204 to estimate the distance of a target object relative to the reader 200, as discussed below. The distance estimation logic 208 and the decoder logic 210 may be executed by the one or more processors 204. In some implementations, one or both of the distance estimation logic 208 and the decoder logic 210 are implemented by multiple processors, by hardware, or by any combination thereof. In one or more implementations, a microcontroller may be used which includes one or more processors, volatile memory which stores acquisitions which are to be processed, and non-volatile memory which stores executable code. Generally, the distance estimation logic 208 and the decoder logic 210 may be implemented in any suitable manner, including hardware, software, electrical circuitry, firmware, on an application specific integrated circuit (ASIC), on a programmable gate array (PGA), or any combination thereof.

The image formation subsystem 202 includes imaging circuitry 212, imaging or receiving optics 214 including one or more imaging or focusing lens, and a one-dimensional (i.e., linear) image sensor or pixel array 216. The focusing lens of the receiving optics 214 focuses light reflected and scattered from the target machine-readable symbol 104 through an aperture onto the linear pixel/image sensor array 216. Thus, the receiving optics 214 focus an image of the target machine-readable symbol 104 (assuming the symbol is within the FOV) onto the array of pixels comprising the linear pixel array 216, thereby enabling the pixel array to capture an image of a target object 102 within a FOV of the image formation subsystem during an exposure period. The FOV of the image formation subsystem 202 may be a function of both the configuration of the linear sensor array 216 and the optical characteristics of the receiving optics 214 and the distance and orientation between the array 216 and the receiving optics.

The linear sensor array 216 may include a charged coupled device (CCD), a complementary metal oxide semi-conductor (CMOS), or other imaging pixel array, operating under the control of the imaging circuitry 212. The linear sensor array 216 may have various numbers of pixels, such as 1000, 2500, 4096, etc. The pixels of the linear sensor array 216 should generally be large enough to provide adequate SNR performance when combined with the image forming optics and the related aperture. For example, in some implementations each of the pixels in the linear sensor array 216 may have a horizontal width of 5.25 μm and a height of 64 μm. The linear sensor array 216 may have an overall length of 10-15 mm (e.g., 13.5 mm), for example. The linear sensor array 216 may also be included in a small package which allows the entire imaging system to have a height or thickness of less than about 10 mm, for example.

The imaging optics 214 may include a wide angle lens which provides an angular FOV of greater than 55° (e.g., 60-70°). The imaging optics 214 may have a relatively short focal length which allows for implementing an overall imaging system which has an overall length less than 15 mm and a thickness which is less than about 10 mm. The aperture of the imaging system provides the desired depth of Field (DoF). In some implementations, the imaging system may be characterized by an f-number in the range of f/#∈[15, 25], for example.

The machine-readable symbol reader 200 includes an illumination subsystem 218 to generate the visible illumination pattern 124 to provide illumination and to aid the operator in aiming the machine-readable symbol reader 200 at the target machine-readable symbol 104. In some implementations, the illumination subsystem 218 may include a light source 220 (e.g., one or more LEDs, lasers, superluminescent diodes), a focusing lens 222 (e.g., collimator) and a pattern generator 224 (e.g., beam shaper) for generating the desired illumination pattern 124. In some implementations, the focusing lens 222 and the pattern generator 224 may be formed in a single optical element.

In some implementations, the illumination pattern 124 is used by the operator to focus on the target machine-readable symbol 104. Upon focusing, the operator depresses a trigger 226 to read or capture an image of the target machine-readable symbol 104. In some implementations, the machine-readable symbol reader 200 has a two-position trigger 226, where the first position activates the illumination subsystem 218 and the second position activates scanning. In some implementations, the machine-readable symbol reader 200 includes an optional motion detector 228 (e.g., accelerometer) that is used to activate the illumination subsystem 218 upon detection of movement of the reader, which may signify that an operator has picked up the reader for a scanning operation.

Figure 3:
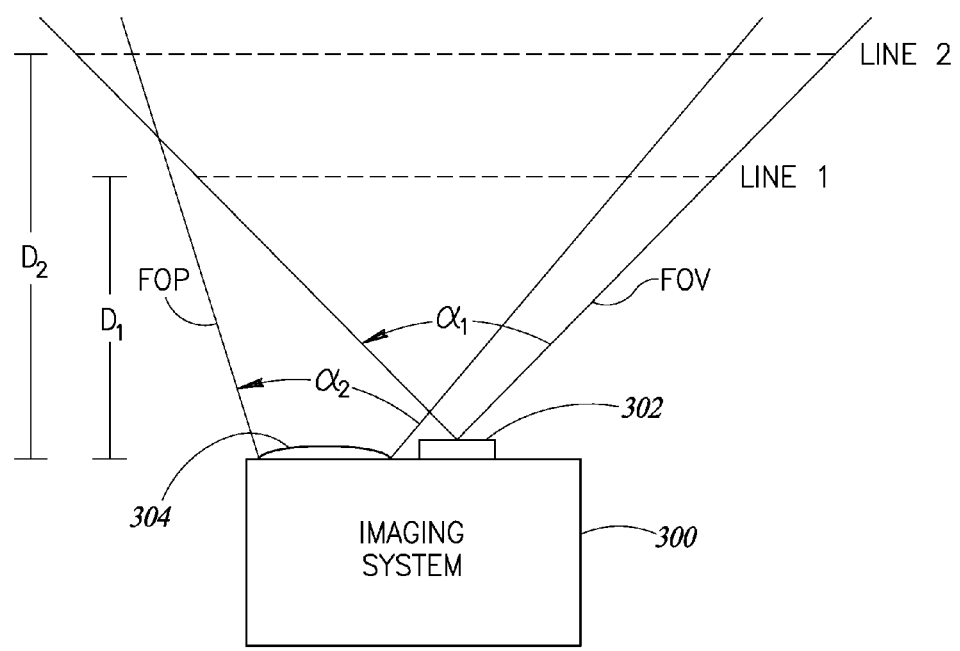
FIG. 3 is a schematic view of an imaging system showing an angular field of view of an image formation subsystem and an angular field of projection for a light generation subsystem, according to one illustrated implementation.
Figure 8:
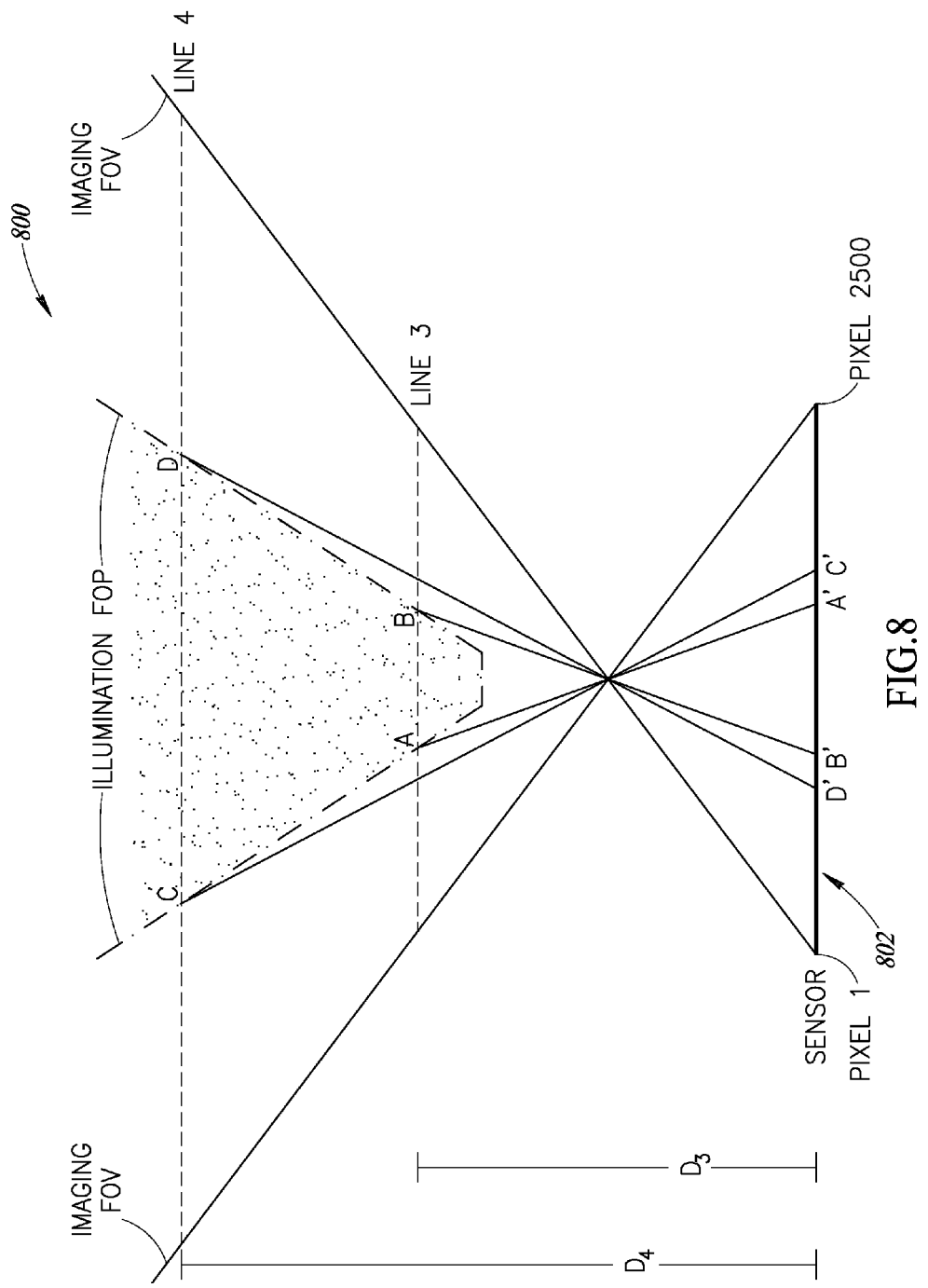
FIG. 8 is a schematic view of an imaging system showing an angular field of view of an image formation subsystem and an angular field of projection for a light generation subsystem, wherein the light generation subsystem includes a symmetric illumination line with respect to the optical axis of the image formation subsystem, according to one illustrated implementation.

The illumination subsystem 218 may project a line having an angular field of projection (FOP) which is less than the FOV of the image formation subsystem 202 so that the line projects to only a portion (e.g., a substantially central portion) of the FOV of the image formation subsystem. For example, the angular FOP may be 50° when the angular FOV is 60° or 70°. As discussed below, the illuminated region may be asymmetric with respect to the sensor array 216 of the image formation subsystem 202, as shown in FIG. 3, or may be symmetric with respect to the sensor array as shown in FIG. 8. In some implementations, at least one lateral side of the sensor array 216 is used to implement the range finder functionality by detecting the at least one edge of the projected line, which at least one edge should be sharp enough so that the edge is detectable with precision. In some implementations, the illumination subsystem 218 generates the visible illumination pattern 124 which has a wavelength chosen to enhance the diffraction limit of the optical system. Generally, lower wavelengths are preferable. For example, the illumination subsystem 218 may generate a green illumination pattern which has a wavelength of between 495 and 570 nm, or between 500-550 nm. The total dimensions of the illumination subsystem 218 may be in the range of 15 mm length, 6 mm width, and a height of between 2 mm and 10 mm, for example.

As discussed further below, the decoder logic 210 may decode any decodable image within one or more images captured by the image formation subsystem 202. If the decoding is successful, decoded data, representative of the data/information coded in the machine-readable symbol 104, is then output via a data input/output system 232, which may include one or more of a wired/wireless communications port, a display, LEDs, an audio output, touchscreen, keys, buttons, etc. Upon a successful imaging and decoding of the machine-readable symbol 104, the input/output system 232 may provide feedback to the operator in the form of a visual indicator and/or an audible indicator.

FIG. 3 is a schematic view of an imaging system 300 comprising an image formation subsystem 302 and an illumination subsystem 304. As shown, the image formation subsystem 302 includes an angular FOV having a first angle $\alpha_1$ (e.g., 60-70°), and the illumination subsystem 304 projects an illumination pattern having an angular FOP of a second angle $\alpha_2$ (e.g., 50°) which is less than the first angle $\alpha_1$. In this implementation, the image formation subsystem 302 includes a linear sensor array having 2500 pixels. A line 1 is shown positioned a distance $D_1$ from the imaging system 300, and a line 2 is shown positioned at a further distance $D_2$ from the imaging system.

Figure 4:
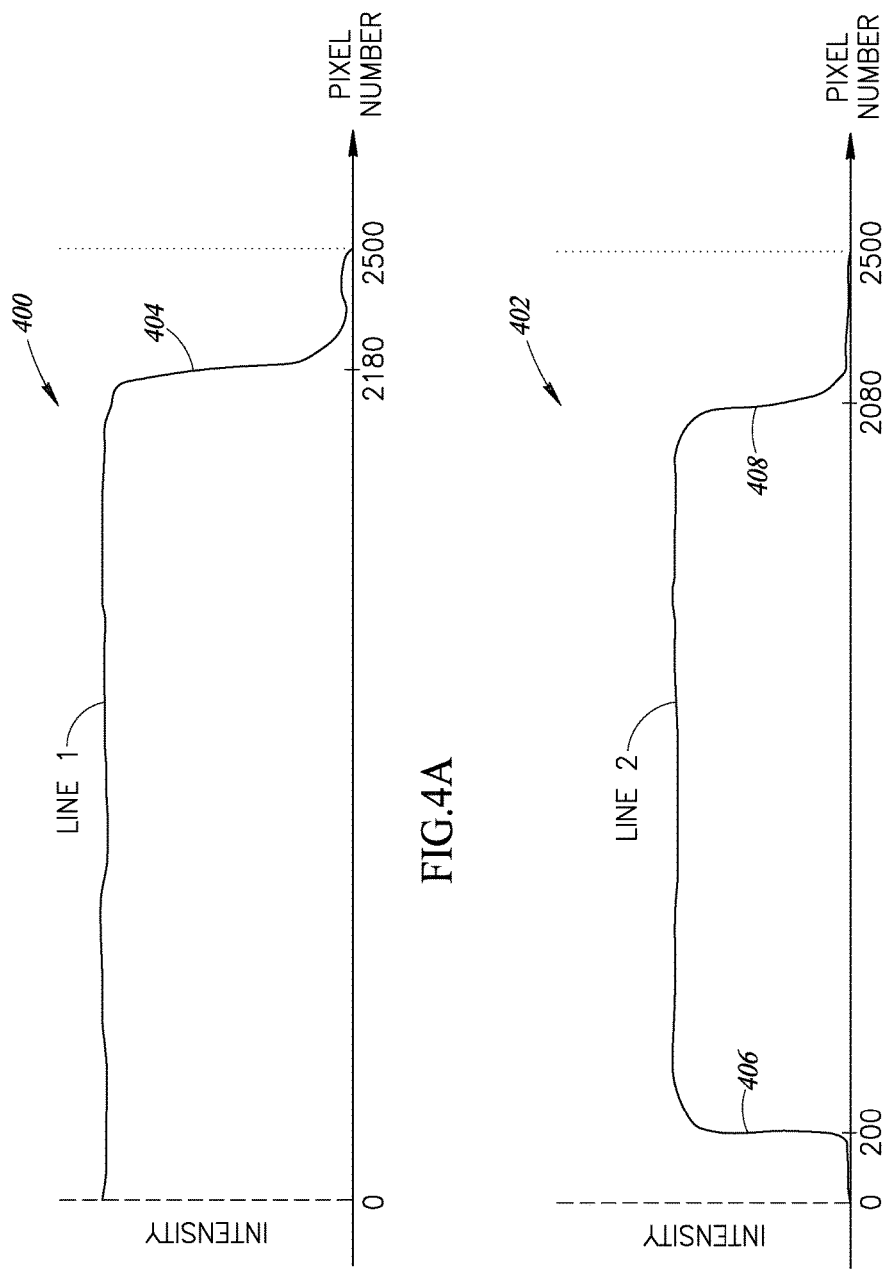
FIG. 4A is a graph of an illumination profile for an array of pixels of an image sensor of an imaging system which captures an illumination line 1 of FIG. 3 at a first distance, according to one illustrated implementation.
FIG. 4B is a graph of an illumination profile for an array of pixels of an image sensor of an imaging system which captures the illumination line 2 of FIG. 3 at a second distance greater than the first distance, according to one illustrated implementation.

FIG. 4A shows an illumination profile 400 along a sensor scan line for the sensor array of the image formation subsystem 302 (FIG. 3) which captures an image of a target object positioned at the illumination line 1 of FIG. 3 at the first distance $D_1$. FIG. 4B shows an illumination profile 402 along a sensor scan line for the linear sensor array of the image formation subsystem 302 which captures an image of a target object positioned at the illumination line 2 of FIG. 3 at the second distance $D_2$.

Since the FOP of the illumination subsystem 304 and the FOV of the image formation system 302 have different origins and inclinations, at each distance (e.g., $D_1$ and $D_2$) a different part of the linear sensor array is illuminated. Generally, two factors may be involved in the calculation of the working distance between the imaging system 300 and a target object. First, the edges of the projected illumination line are located in different positions dependent on the working distance. FIG. 4A shows a single edge 404 indicated by a transition from high signal level to a low signal level at around pixel 2180 of the linear sensor. FIG. 4B shows a first edge 406 indicated by a transition from low signal level to a high signal level at around pixel 200, and a second edge 406 indicated by a transition from high signal level to a low signal level at around pixel 2080. Moreover, if the origin of the FOP of the illumination subsystem 304 is not located on the optical axis of the image formation subsystem 302, at very short distances only one edge (e.g., edge 404 of FIG. 4A) of the illumination line is visible. Second, the difference between the high and low signal levels is larger at shorter distances than at greater distances. For example, the difference between the high and low signals shown in FIG. 4A for the first distance $D_1$ are greater than the difference between the high and low signals shown in FIG. 4B for the further distance $D_2$.

Figure 5:
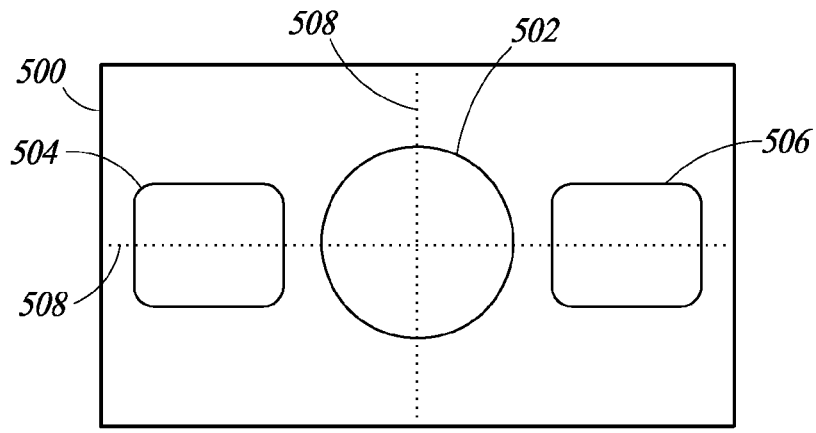
FIG. 5 is a top plan view of an imaging system which includes an image formation subsystem that includes receiving optics, and an illumination subsystem which includes two elements disposed symmetrically on opposite sides of the receiving optics, according to one illustrated implementation.

FIG. 5 shows a top plan view of an imaging system 500 which includes an image formation subsystem that includes receiving optics 502, and an illumination subsystem which includes two optical assemblies or elements 504 and 506 (e.g., one or more collimators, beam shapers, etc.) disposed symmetrically on opposite sides of the receiving optics. FIG. 5 also shows an optical axis 508 of the imaging system 500 in dashed lines.

Figure 6:
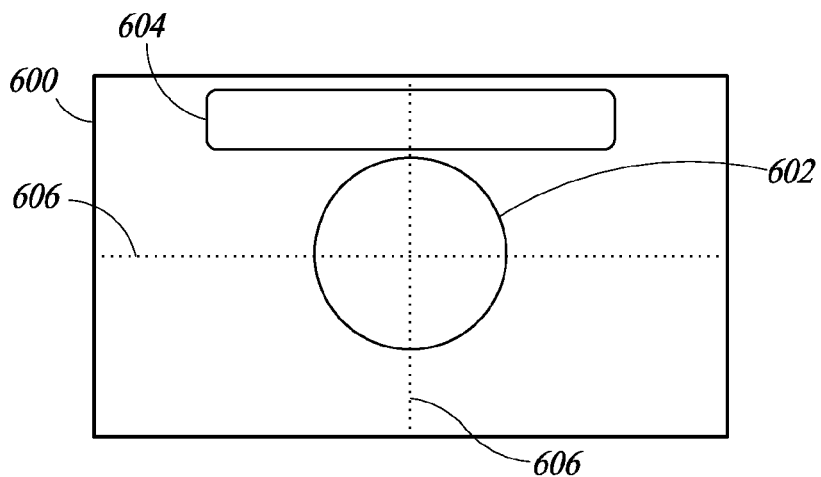
FIG. 6 is a top plan view of an imaging system which includes an image formation subsystem that includes receiving optics, and an illumination subsystem which includes a single element disposed above the receiving optics, according to one illustrated implementation.

FIG. 6 shows top plan view of an imaging system 600 which includes an image formation subsystem that includes receiving optics 602, and an illumination subsystem which includes a single optical element 604 (e.g., one or more collimators, beam shapers, etc.) disposed above the receiving optics. FIG. 6 also shows an optical axis 606 of the imaging system in dashed lines.

Figure 7:
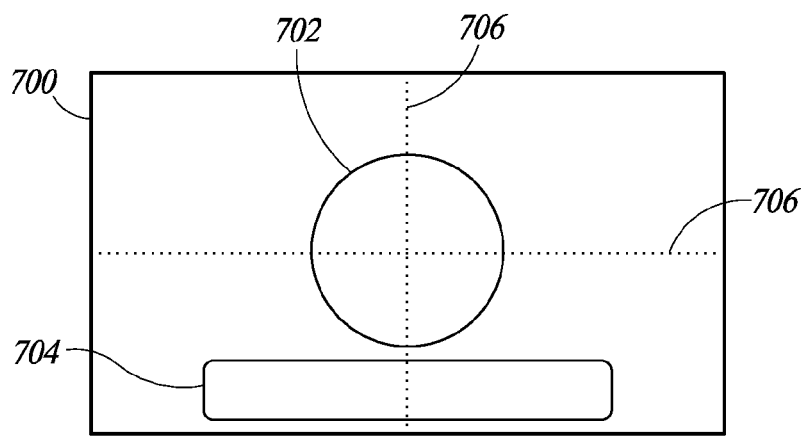
FIG. 7 is a top plan view of an imaging system which includes an image formation subsystem that includes receiving optics, and an illumination subsystem which includes a single element disposed below the receiving optics, according to one illustrated implementation.

FIG. 7 shows a top plan view of an imaging system which includes an image formation subsystem that includes receiving optics 702, and an illumination subsystem which includes a single optical element 704 (e.g., one or more collimators, beam shapers, etc.) disposed below the receiving optics. FIG. 7 also shows an optical axis 706 of the imaging system in dashed lines.

In the implementations of FIGS. 5-7, the each of the optics elements of respective illumination subsystems is horizontally symmetric with respect to the respective optical axes.

FIG. 8 shows schematic diagram 800 of an angular imaging FOV of a sensor 802 of an image formation subsystem and an angular FOP for an illumination subsystem, wherein the illumination subsystem provides a horizontally symmetric illumination line with respect to the optical axis of the image formation subsystem (see FIGS. 5-7). A line 3 is shown positioned a distance $D_3$ from the imaging system, and a line 4 is shown positioned at a further distance $D_4$ from the imaging system. In this case, the distance estimation logic or range finder may calculate the working distance according to the number of illuminated pixels and the number of dark pixels. As shown in FIG. 8, the angular FOV of the image formation subsystem is imaged on the entire sensor (i.e., pixel 1 to pixel 2500). However, only the central portion of the FOV may be of interest to the decoder logic which decodes the machine-readable symbol. Since the origins of the FOV and the FOP are different, the edges of the illumination line are imaged on different sensor pixels according to the working distance.

Figure 9:
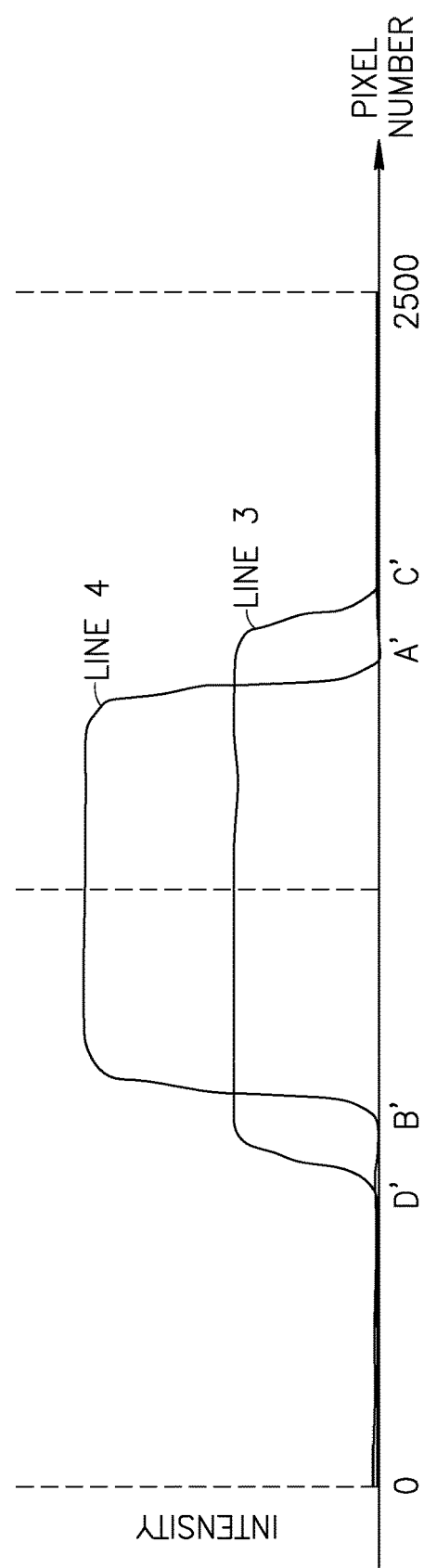
FIG. 9 is a graph of illumination profiles for an array of pixels of an image sensor of an imaging system which captures illumination lines 3 and 4 of FIG. 8, according to one illustrated implementation.

FIG. 9 shows illumination profiles along a sensor scan line for the lines 3 and 4 of FIG. 8 positioned at distances $D_3$ and $D_4$, respectively. Considering the different locations of the points A'-C' and B'-D' (FIG. 8) and the different intensity levels of the two signals, the distance estimation logic may estimate the distance at which the two scans are taken.

Figure 10:
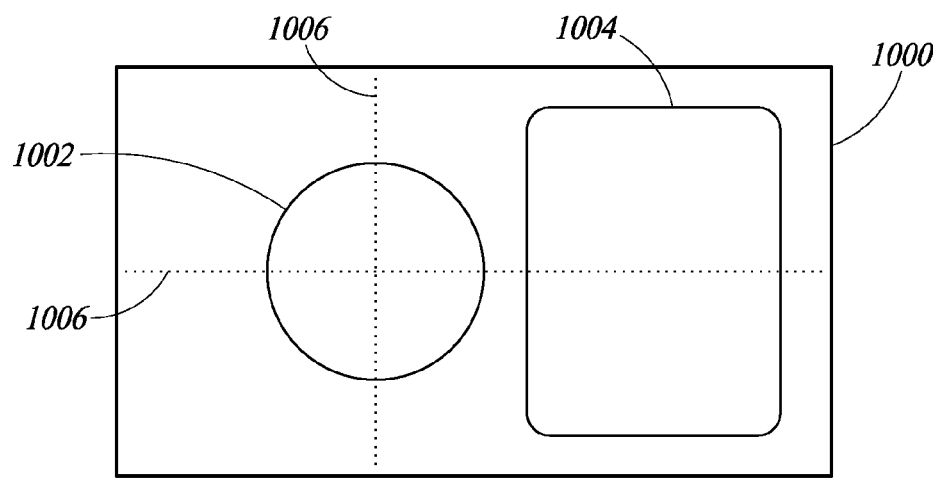
FIG. 10 is a top plan view of an imaging system which includes an image formation subsystem that includes receiving optics, and an illumination subsystem which includes a single element disposed to the right of the receiving optics, according to one illustrated implementation.

FIG. 10 shows a top plan view of an imaging system 1000 which includes an image formation subsystem that includes receiving optics 1002, and an illumination subsystem which includes a single optical element 1004 (e.g., one or more lenses) disposed to the right of the receiving optics. FIG. 10 also shows an optical axis 1006 of the imaging system in dashed lines.

Figure 11:
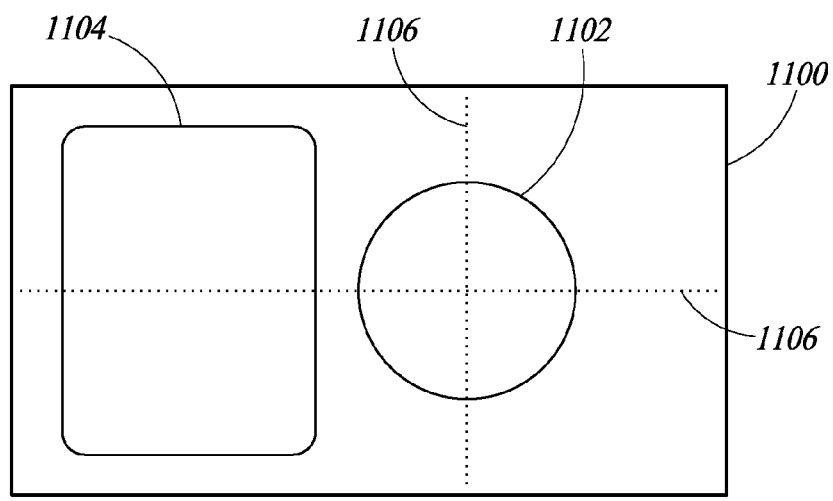
FIG. 11 is a top plan view of an imaging system which includes an image formation subsystem that includes receiving optics, and an illumination subsystem which includes a single element disposed to the left of the receiving optics, according to one illustrated implementation.

FIG. 11 shows a top plan view of an imaging system 1100 which includes an image formation subsystem that includes receiving optics 1102, and an illumination subsystem which includes a single optical element 1104 (e.g., one or more lenses) disposed to the left of the receiving optics. FIG. 11 also shows an optical axis 1106 of the imaging system in dashed lines.

In the imaging systems of FIGS. 10 and 11, the optical elements 1004 and 1104 are decentered with respect to the respective optical axes 1006 and 1106. Additionally, the illumination subsystems include a single optical assembly or element (e.g., one or more collimators, beam shapers, etc.) on one side of the receiving optics of the image formation subsystems. In the implementations shown in FIGS. 10 and 11, the misalignment between the optical axes and the optical elements of the respective illumination subsystems may be exploited to estimate the working distance.

The illumination subsystems disclosed herein may be any suitable system capable of generating a uniform and sharp illumination pattern (e.g., line) which fills a desired angular FOP. As noted above, the light source of the illumination subsystems may include an LED, a laser, or a superluminescent diode, for example, as a single emitter or an array of emitters. In some implementations, the illumination subsystem includes a first collimating lens which collimates the emission from the light source into a small point, and a beam shaper element which generates the illumination pattern (e.g., line). In some implementations, the illumination system may include a single optical element which performs the collimating and beam shaping functions.

One method for dimensioning an image system is to begin with a focal length which is able to fit the final volume and an F-number which allows for a determined depth of field. An example of parameters determined using this method follows.

The method may include the following as input parameters: focal length (f)=10 mm; F-number (f/#)=20; horizontal pixel pitch (w)=5.25 µm; total number of pixels ($N_{tot}$)=2500; effective field of view ($FOV_{eff}$)=50°.

The output parameters may be determined as follows: total array length ($L_{tot}$)=w×$N_{tot}$=13.125 mm; effective array length ($L_{eff}$)=2×f×tan(0.5×$FOV_{eff}$)=9.326 mm; effective number of pixels ($N_{eff}$)=$L_{eff}$/W=1776 pixels; aperture size (d)=f/(f/#)=0.5 mm; and total field of view ($FOV_{tot}$)=2×a tan(0.5×$L_{tot}$/f)=67°.

As another example, if the total number of pixels is the most important parameter for guaranteeing a good resolution for the sensor, the system may be dimensioned considering this parameter first. In such a case, example input parameters may include: F-number (f/#)=20; horizontal pixel pitch (w)=5.25 µm; total number of pixels (Ntot)=2500; effective number of pixels ($N_{eff}$)=2000; effective field of view ($FOV_{eff}$)=50°.

The output parameters for this second example may be determined as follows: total array length ($L_{tot}$)=w×$N_{tot}$=13.125 mm; effective array length ($L_{eff}$)=w×$N_{eff}$=10.5 mm; focal length (f)=$L_{eff}$/(2×tan(0.5×$FOV_{eff}$))=11.3 mm; aperture size (d)=f/(f/#)=0.565 mm; and total field of view ($FOV_{tot}$)=2×a tan (0.5×$L_{tot}$/f)=60.3°.

It is noted that the wavelength used by the illumination subsystem for the illumination line may be an important parameter for controlling diffraction effects. Generally, smaller wavelengths produce better horizontal resolution for the system. For example, considering a lens with an f/#=20, a green wavelength (e.g., λ=510 nm) may have a horizontal resolution of 2.44×λ×f/#=25 µm, whereas a red wavelength (e.g., λ=630 nm) may have a horizontal resolution of 2.44×λ×f/#=31 µm.

Figure 12:
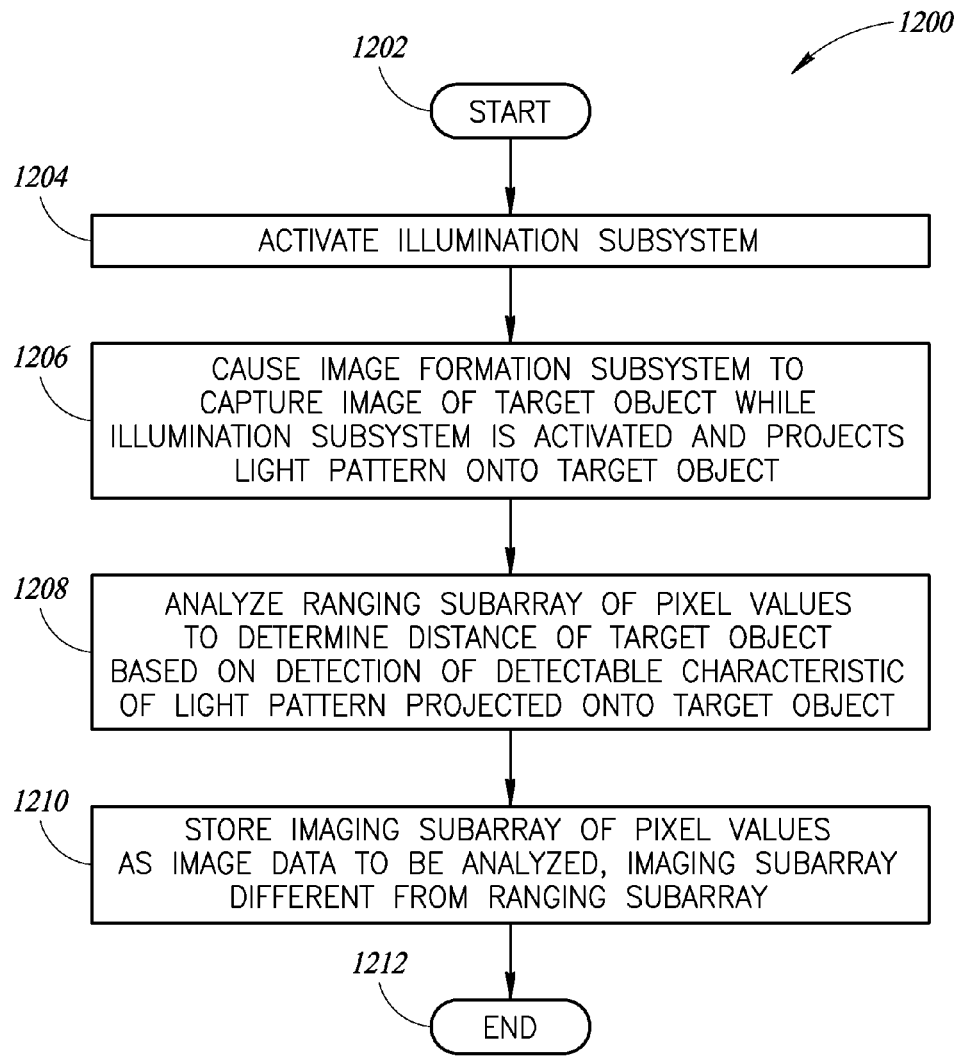
FIG. 12 is a flow diagram of a method of operation for a machine-readable symbol reader to capture an image of a machine-readable symbol on a target object while measuring the distance of the target object relative to the machine-readable symbol reader, according to one illustrated implementation.

FIG. 12 is a flow diagram of a high-level method 1200 for a machine-readable symbol reader to capture an image of a machine-readable symbol positioned on a target object and to determine a distance between the machine-readable symbol reader and the target object when the image is captured. The method 1200 may be executed by a machine-readable symbol reader, such as the machine-readable symbol readers 100 and 200 of FIGS. 1 and 2, respectively. The machine-readable symbol reader may include an image formation subsystem which includes a sensor including a one-dimensional array of photosensitive elements. The image formation subsystem may also include one or more receiver optical elements which focus light onto the sensor to provide the image formation subsystem with an angular FOV having a first angle (e.g., 60°, 70°). The machine-readable symbol reader may also include an illumination subsystem which includes at least one light source which projects a light pattern (e.g., line) having an angular FOP defined by a second angle (e.g., 50°, 55°) less than the first angle. The angular FOV of the image formation subsystem may have at least one of a different origin or a different inclination from the angular FOP of the illumination subsystem. In some implementations, the angular FOP of the illumination subsystem may be vertically or horizontally symmetric with the angular field of view of the image formation subsystem. The light source may include at least one of a light emitting diode (LED), a laser, or a superluminescent diode. In some implementations, the light source includes a single pixel light emitting diode (LED) light source having a width of approximately 25 µm and a length of approximately 1000 µm, for example.

The method 1200 begins at 1202, for example, when a user picks up a machine-readable symbol reader to scan a machine-readable symbol (e.g., 1D or 2D barcode, alphanumeric characters) placed on a target object or item (e.g., clothing, packaging, circuit board).

At 1204, at least one processor of the machine-readable symbol reader may activate the illumination subsystem thereof, which causes a light pattern (e.g., line) to be projected onto the target object which contains the machine-readable symbol. As noted above, the light pattern may be projected at a defined angular FOP which is less than the angular FOV of the image formation subsystem.

At 1206 the at least one processor may cause the image formation subsystem to capture a scan or image of the target object while the illumination subsystem is activated and projects the light pattern onto the target object. The captured image may include an array of pixel values which each correspond to a quantity of light incident on a corresponding one of the photosensitive elements in the one-dimensional array of photosensitive elements.

At 1208, the at least one processor may analyze a ranging subarray of the pixel values to determine a distance of the target object from the imaging system based at least in part on detection of at least a portion of a periphery (e.g., an edge) of the light pattern projected onto the target object by the at least one light source. For example, the at least one processor may analyze the ranging subarray of the pixel values to determine a distance based at least in part on detection of a location of at least a portion of the periphery (e.g., an edge or border) of the light pattern projected onto the target object. As another example, the at least one processor may analyze the ranging subarray of the pixel values to determine a distance based at least in part on detection of a relative signal level for at least a portion of the periphery of the light pattern projected onto the target object.

At 1210, the at least one processor may store an imaging subarray of the pixel values in a nontransitory processor-readable storage medium of the machine-readable symbol reader as image data to be analyzed by decoder logic to detect one or more machine-readable symbols therein. In some implementations, the decoder logic may utilize the estimated distance to adjust one or more parameters, which provides more accurate decoding.

In some implementations, the imaging subarray of the pixels values does not overlap with the ranging subarray of the pixel values. For instance, the ranging subarray of the pixel values may correspond to a subarray of photosensitive elements at a least one lateral end portion of the array of photosensitive elements (e.g., pixels 1-500 of an array having pixels 1-2500; pixels 1-250 and pixels 2251-2500 of an array having pixels 1-2500). The imaging subarray of the pixel values may correspond to a subarray of photosensitive elements which does not include photosensitive elements at the lateral end portions of the array of photosensitive elements (e.g., pixels 500-2000 of an array having pixels 1-2500).

In some implementations, the array of photosensitive elements may include an ordered number N of the photosensitive elements $PE_{1-N}$ and the array of pixel values includes a corresponding ordered number N of the pixel values $PV_{1-N}$ (e.g., $PV_{1-2500}$). The ranging subarray may include pixel values $PV_{1-X}$ (e.g., $PV_{1-300}$) on one lateral end of the sensor array and the pixel values $PV_{Y-N}$ (e.g., $PV_{2200-2500}$) on the other lateral end of the sensor array, where X is less than Y, and Y is less than N. The centrally located imaging subarray may include the pixel values $PV_{(X+1)-(Y-1)}$ (e.g., $PV_{301-2199}$). In some implementations, the number of the pixel values $PV_{1-N}$ on one lateral end of the sensory array is equal to the number of the pixel values $PV_{Y-N}$ on the other lateral end of the sensor array, although such is not required. In some implementations, the ranging subarray is located on only one lateral end of the sensor array rather than both lateral ends of the sensor array.

In some implementations, the at least one light source projects a light pattern in the form of a line, and the periphery of the light pattern is a first end edge of the line and a second end edge of the line opposite the first end edge of the line.

By carrying out the aforementioned distance measurement processes using dedicated portions (e.g., lateral ends) of the sensor array, the systems disclosed herein may advantageously perform both machine-readable symbol imaging and distance measurement with the same acquisition. In instances where the portions of the sensor dedicated to distance measurement are two opposite ends of the sensor array, two edges of the illumination line may be detected, which improves precision relative to cases where only one edge of the illumination line is detectable.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof, any of which may be referred to herein as one or more processors. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computer systems, microcontrollers, microprocessors, digital signal processors, graphics processing units, as firmware, or as virtually any combination thereof, and that designing the circuitry and/or writing the code for the software and or firmware to implement one or more processors or controllers would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:
1. An imaging system, comprising:
   at least one image formation subsystem which includes:
      a sensor including a one-dimensional array of photosensitive elements; and
      at least one receiver optical element which focuses light onto the sensor to provide the at least one image formation subsystem with an angular field of view having a first angle;
   at least one illumination subsystem which includes:
      at least one light source which projects a light pattern having an angular field of projection defined by a second angle, the second angle less than the first angle;
   at least one processor operatively coupled to the at least one image formation subsystem and the at least one illumination subsystem;
   at least one nontransitory processor-readable storage medium operatively coupled to the at least one processor and storing at least one of data or instructions which, when executed by the at least one processor, cause the at least one processor to:
      receive an image of a target object from the at least one image formation subsystem captured thereby while the at least one illumination subsystem is activated and projects the light pattern onto the target object, the image includes an array of pixel values which each correspond to a quantity of light incident on a corresponding one of the photosensitive elements in the one-dimensional array of photosensitive elements;

analyze the ranging subarray of the pixel values to determine a distance of the target object from the imaging system based at least in part on:
 detection of a location of at least a portion of the periphery of the light pattern projected onto the target object by the at least one light source; or
 detection of a relative signal level for at least a portion of the periphery of the light pattern projected onto the target object by the at least one light source; and
 store an imaging subarray of the pixel values in the at least one nontransitory processor-readable storage medium as image data to be analyzed to detect one or more machine-readable symbols therein, the imaging subarray of the pixels values different from the ranging subarray of the pixel values.

2. The imaging system of claim 1 wherein the ranging subarray of the pixel values corresponds to a subarray of photosensitive elements at a least one lateral end portion of the array of photosensitive elements.

3. The imaging system of claim 1 wherein the imaging subarray of the pixel values corresponds to a subarray of photosensitive elements which does not include photosensitive elements at the lateral end portions of the array of photosensitive elements.

4. The imaging system of claim 1 wherein the at least one light source projects a light pattern comprising a line, and the periphery of the light pattern comprises a first end edge of the line and a second end edge of the line opposite the first end edge of the line.

5. The imaging system of claim 1 wherein the array of photosensitive elements comprises an ordered number N of the photosensitive elements $PE_{1-N}$ and the array of pixel values comprises a corresponding ordered number N of the pixel values $PV_{1-N}$, and the ranging subarray comprises the pixel values $PV_{1-X}$ and the pixel values $PV_{Y-N}$ and the imaging subarray comprises the pixel values $PV_{(X+1)-(Y-1)}$, where X is less than Y, and Y is less than N.

6. The imaging system of claim 5 wherein the number of the pixel values $PV_{1-X}$ is equal to the number of the pixel values $PV_{Y-N}$.

7. The imaging system of claim 1 wherein the at least one light source projects a light pattern having a predominant wavelength of between 495 and 570 nanometers.

8. The imaging system of claim 1 wherein the at least one light source comprises at least one of: a light emitting diode (LED), a laser, or a superluminescent diode.

9. The imaging system of claim 1 wherein the at least one light source comprises a single pixel light emitting diode (LED) light source.

10. The imaging system of claim 1 wherein each of the photosensitive elements has a width less than or equal to 5.25 micrometers and a length less than or equal to 64.0 micrometers.

11. The imaging system of claim 1 wherein the angular field of view of the at least one image formation subsystem has at least one of a different origin or a different inclination from the angular field of projection of the at least one illumination subsystem.

12. The imaging system of claim 1 wherein the angular field of projection of the at least one illumination subsystem is horizontally symmetric with the angular field of view of the at least one image formation subsystem.

13. The imaging system of claim 1 wherein the at least one illumination subsystem comprises:

a first lens which collimates light from the at least light source; and
a beam shaper which generates the light pattern.

14. The imaging system of claim 1 wherein the one-dimensional array of photosensitive elements comprises at least 2500 photosensitive elements, and the imaging subarray of the pixel values corresponds to at least 2000 of the photosensitive elements.

15. The imaging system of claim 1 wherein the at least one image formation subsystem and the at least one illumination subsystem have a combined length less than or equal to 21 millimeters, a combined width less than or equal to 16 millimeters, and a combined height less than or equal to 12 millimeters.

16. A method of operation for an imaging system, the imaging system including at least one image formation subsystem which includes: a sensor including a one-dimensional array of photosensitive elements; and at least one receiver optical element which focuses light onto the sensor to provide the at least one image formation subsystem with an angular field of view having a first angle; at least one illumination subsystem which includes: at least one light source; at least one processor operatively coupled to the at least one image formation subsystem and the at least one illumination subsystem; at least one nontransitory processor-readable storage medium operatively coupled to the at least one processor and storing at least one of data or instructions, the method comprising:
 receiving, by the at least one processor from the at least one image formation subsystem, an image of a target object captured while the at least one illumination subsystem is activated and projects a light pattern onto the target object, the light pattern having an angular field of projection defined by a second angle, the second angle less than the first angle, the image includes an array of pixel values which each correspond to a quantity of light incident on a corresponding one of the photosensitive elements in the one-dimensional array of photosensitive elements;
 analyzing, by the at least one processor, a ranging subarray of the pixel values to determine a distance of the target object from the imaging system based at least in part on:
  detection of a location of at least a portion of the periphery of the light pattern projected onto the target object by the at least one light source; or
  detection of a relative signal level for at least a portion of the periphery of the light pattern projected onto the target object by the at least one light source; and
 storing, by the at least one processor, an imaging subarray of the pixel values in the at least one nontransitory processor-readable storage medium as image data to be analyzed to detect one or more machine-readable symbols therein, the imaging subarray of the pixels values different from the ranging subarray of the pixel values.

17. The method of claim 16 further comprising:
 activating, by the at least one processor, the at least one illumination subsystem which causes the at least one light source thereof to project a line, and the periphery of the light pattern comprises a first end edge of the line and a second end edge of the line opposite the first end edge of the line.

18. The method of claim 16 wherein analyzing a ranging subarray of the pixel values comprises analyzing a ranging subarray of the pixel values, the array of photosensitive elements comprises an ordered number N of the photosensitive elements $PE_{1-N}$ and the array of pixel values comprises a corresponding ordered number N of the pixel values $PV_{1-N}$, the ranging subarray comprises the pixel values $PV_{1-X}$ and the pixel values $PV_{Y-N}$ and the imaging subarray comprises the pixel values $PV_{(X+1)-(Y-1)}$, where X is less than Y, and Y is less than N.

19. An imaging system, comprising:
    a sensor including an array of photosensitive elements having an angular field of view having a first angle that is between 60 degrees and 70 degrees;
    at least one light source which projects a light pattern having an angular field of projection defined by a second angle that is between 40 degrees and 60 degrees;
    at least one processor operatively coupled to the at least one sensor and the at least one light source;
    at least one nontransitory processor-readable storage medium operatively coupled to the at least one processor and storing at least one of data or instructions which, when executed by the at least one processor, cause the at least one processor to:
        receive an image of a target object from the sensor captured while the at least one light source is activated and projects the light pattern onto the target object, the image includes an array of pixel values which each correspond to a quantity of light incident on a corresponding one of the photosensitive elements in the array of photosensitive elements;
        analyze a ranging subarray of the pixel values of the captured image to determine a distance of the target object from the imaging system based at least in part on:
            detection of a location of at least a portion of a detectable characteristic of the light pattern projected onto the target object by the at least one light source; or
            detection of a relative signal level for at least a portion of the detectable characteristic of the light pattern projected onto the target object by the at least one light source; and
        store an imaging subarray of the pixel values of the captured image in the at least one nontransitory processor-readable storage medium as image data to be analyzed to detect one or more machine-readable symbols therein, the imaging subarray of the pixels values different from the ranging subarray of the pixel values.

20. The imaging system of claim 19 wherein the ranging subarray of the pixel values corresponds to a subarray of photosensitive elements at a least one lateral end portion of the array of photosensitive elements.

21. The imaging system of claim 19 wherein the imaging subarray of the pixel values corresponds to a subarray of photosensitive elements which does not include photosensitive elements at the lateral end portions of the array of photosensitive elements.

22. The imaging system of claim 19 wherein the at least one light source projects a light pattern comprising a line, and the detectable characteristic of the light pattern comprises a first end edge of the line and a second end edge of the line opposite the first end edge of the line.

23. The imaging system of claim 19 wherein the at least one light source projects a light pattern having a predominant wavelength of between 495 and 570 nanometers.

24. The imaging system of claim 19 wherein the at least one light source comprises at least one of: a light emitting diode (LED), a laser, or a superluminescent diode.

25. The imaging system of claim 19 wherein the at least one light source comprises a single pixel light emitting diode (LED) light source.

26. The imaging system of claim 19 wherein each of the photosensitive elements has a width less than or equal to 5.25 micrometers and a length less than or equal to 64.0 micrometers.

27. The imaging system of claim 19 wherein the angular field of view of the at least one sensor has at least one of a different origin or a different inclination from the angular field of projection of the at least one light source.

28. The imaging system of claim 19 wherein the angular field of projection of the at least one light source is horizontally symmetric with the angular field of view of the at least one sensor.

* * * * *